(12) United States Patent
Akatsuka et al.

(10) Patent No.: US 7,608,336 B2
(45) Date of Patent: Oct. 27, 2009

(54) FLAME-RETARDANT EPOXY RESIN COMPOSITION AND CURED PRODUCT OBTAINED THEREFROM

(75) Inventors: Yasumasa Akatsuka, Sanyoonoda (JP); Shigeru Moteki, Annaka (JP); Makoto Uchida, Saitama (JP); Kazunori Ishikawa, Misato (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 258 days.

(21) Appl. No.: 11/148,471

(22) Filed: Jun. 9, 2005

(65) Prior Publication Data
US 2006/0003165 A1   Jan. 5, 2006

Related U.S. Application Data

(63) Continuation-in-part of application No. 10/536,206, filed on May 24, 2005, now abandoned.

(30) Foreign Application Priority Data

| Nov. 28, 2002 | (JP) | ............ 2002-346265 |
| Mar. 13, 2003 | (JP) | ............ 2003-67584 |

(51) Int. Cl.
| C08L 77/00 | (2006.01) |
| C08L 63/02 | (2006.01) |
| C08G 63/00 | (2006.01) |
| C08G 69/00 | (2006.01) |

(52) U.S. Cl. ............ 428/458; 428/473.5; 428/474.4; 524/356; 524/361; 525/423; 528/339; 523/420

(58) Field of Classification Search ............ 525/423; 524/356, 361; 428/458, 473.5, 474.4; 528/339; 523/420

See application file for complete search history.

(56) References Cited

U.S. PATENT DOCUMENTS

| 5,686,557 A | 11/1997 | Kiyohara et al. ............ 528/310 |
| 6,956,100 B2 * | 10/2005 | Imaizumi et al. ............ 528/310 |

FOREIGN PATENT DOCUMENTS

| JP | 4-252225 | 9/1992 |
| JP | 8-208981 | 8/1996 |
| JP | 2000-297151 | 10/2000 |
| JP | 2000-313787 | 11/2000 |
| JP | 2002-069270 | 3/2002 |
| JP | 2002-129101 | 5/2002 |
| WO | 02/00791 | 1/2002 |
| WO | WO 02/34850 | * 5/2002 |

* cited by examiner

Primary Examiner—Ana L Woodward
(74) Attorney, Agent, or Firm—Nields, Lemack & Frame, LLC

(57) ABSTRACT

The invention relates to an epoxy resin composition containing (a) an epoxy resin and (b) a phenolic hydroxy group-containing polyamide resin having the structure represented by Formula (1), a method of curing the composition, a varnish, prepreg, or sheet using the composition, and an epoxy resin composition having the polyamide resin represented by Formula (1) as the active component.

Cured products of the epoxy resin composition according to the present invention have a sufficient high flexibility when formed into a thin film, have a flame resistance even though the cured compositions do not contain a halogen flame retardant, an antimony compound, or the like and are superior in heat resistance and adhesiveness, and thus are extremely useful in a wide range of applications, for example, as molded materials, cast materials, laminate materials, paints, adhesives, resists, and the like.

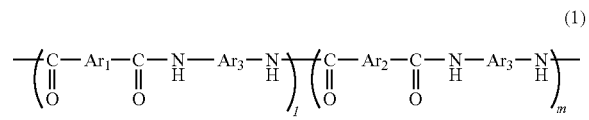

(1)

(wherein, l and m are averages, satisfying the formula: $m/(l+m) \geq 0.01$; and $l+m$ is a positive number of 2 to 200. $Ar_1$ represents a bivalent aromatic group; $Ar_2$ represents a phenolic hydroxyl group-containing bivalent aromatic group; and $Ar_3$ represents:

-ph($R_1$)n- or

-ph($R_2$)n-X-ph($R_3$)n-, wherein, -ph($R_1$)n-, -ph($R_2$)n- and -ph($R_3$)n- represent respectively $R_1$-substituted, $R_2$-substituted and $R_3$-substituted phenylene groups, or an unsubstituted phenylene group; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond).

22 Claims, No Drawings

FLAME-RETARDANT EPOXY RESIN COMPOSITION AND CURED PRODUCT OBTAINED THEREFROM

This application is a Continuation-in-Part of U.S. Ser. No. 10/536,206 filed May 24, 2005 now abandoned.

TECHNICAL FIELD

The present invention relates to an epoxy resin curing agent, an epoxy resin composition containing the epoxy resin curing agent, and the cured product thereof.

BACKGROUND ART

Epoxy resins are cured with a variety of curing agents into cured products generally superior in mechanical properties, water resistance, chemical resistance, heat resistance, electrical properties, and the like, and have been used, for example, as adhesives, paints, laminated plates, molding materials, and casting materials in a wide range of industrial fields. Conventionally, the epoxy resins that have been used most widely are bisphenol A epoxy resins. Acid anhydrides and amine compounds are known as the curing agents for epoxy resins, but phenolic novolak resins are often used in the field of electric and electronic parts for the purpose of improving reliability, for example, of heat resistance. Flame retardants are often used for the purpose of improving flame resistance of the cured products, and bromine-containing compounds such as tetrabromobisphenol A and the epoxidized derivatives thereof, and the reaction products from tetrabromobisphenol A and a bisphenol A epoxy resin are generally known as such flame retardants.

However, although the bromine-containing compounds described above are effective in making resins superior in flame resistance, they are pointed out to generate the substances possibly causing environmental pollution during disposal and incineration. In addition, there is also a concern about the toxicity of the antimony compounds that are used as the flame retardant aids. Among the recent enhanced recognition about environmental protection, there is an increasing need for halogen-free and antimony-free epoxy resin compositions. In addition, cured epoxy resins prepared by using a phenolic novolak as the curing agent are superior in reliability, but the cured products are rigid and lack flexibility. There are recently various electric and electronic parts different in shape, and in addition to plate-shaped parts using conventional large package and rigid base plates containing glass textile as a base material, sheet-shaped parts (shaped products) using a flexible sheet-shaped base material such as polyimide film, PET (polyethylene terephthalate) film, or metal foil have been developed. The shaped products are usually produced by coating an epoxy resin composition in the form of varnish on a sheet-shaped base plate, removing the solvent, and then curing the coated epoxy resin composition. In such a case, the cured product obtained should be sufficient flexible and highly adhesive to the base material, for example, of polyimide. The cured product should also have a high heat resistance, from the viewpoint of the reliability of the resulting electric and electronic parts.

Separately, an epoxy resin composition containing an epoxy resin, a phenol resin and a phenolic hydroxyl group-containing aromatic polyamide resin was disclosed as an epoxy resin improved in the fragility associated with conventional epoxy resin compositions in JP-A No. 2000-313787, and was described to have a high heat resistance and toughness. However, the flexibility and the flame resistance thereof, which are able to be used for a sheet-shaped base plate, are not described there and seem to be still unsatisfactory.

DISCLOSURE OF THE INVENTION

Under the circumstances above, the inventors have conducted an intensive study for an epoxy resin composition that gives a cured product resistant to flame even without an added bromine-based or other flame retardant, superior in heat resistance and adhesiveness, and sufficiently flexible when formed into the sheet shape in case of curing, and completed the present invention.

Namely, the present invention relates to the followings:

1. An epoxy resin composition, characterized by containing an epoxy resin (a) and a polyamide resin (b) having the structure represented by the following Formula (1)

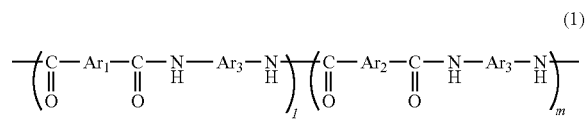

(wherein, l and m are averages, satisfying the formula: m/(l+m)=0.01; and l+m is a positive number of 2 to 200. $Ar_1$ represents a bivalent aromatic group; $Ar_2$ represents a phenolic hydroxyl group-containing bivalent aromatic group; and $Ar_3$ represents:

-ph($R_1$)n- or

-ph($R_2$)n-X-ph($R_3$)n-, wherein, -ph($R_1$)n-, -ph($R_2$)n- and -ph($R_3$)n- represent respectively $R_1$-substituted, $R_2$-substituted and $R_3$-substituted phenylene groups, or an unsubstituted phenylene group; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond);

2. The epoxy resin composition according to above mentioned 1, wherein the equivalence of the active hydrogen in component (b) is 0.7 to 1.2 equivalences relative to 1 equivalence of the epoxy group in component (a);

3. The epoxy resin composition according to above mentioned 1, wherein the content of the polyamide resin of component (b) is 30 wt % or more relative to all curing agents contained in the composition;

4. The epoxy resin composition according to above mentioned 1, containing the epoxy resin of component (a) in an amount of 2 to 50 wt % and the curing agent of component (b) in an amount of 50 to 98 wt % in the entire composition;

5. The epoxy resin composition according to any one of above mentioned 1 to 4, wherein $Ar_3$ is a group represented by:

-ph($R_1$)n- or

-ph($R_2$)n-O-ph($R_3$)n-;

6. The epoxy resin composition according to any one of above mentioned 1 to 4, wherein the polyamide resin of component (b) is a compound having the structure represented by the following Formula (3):

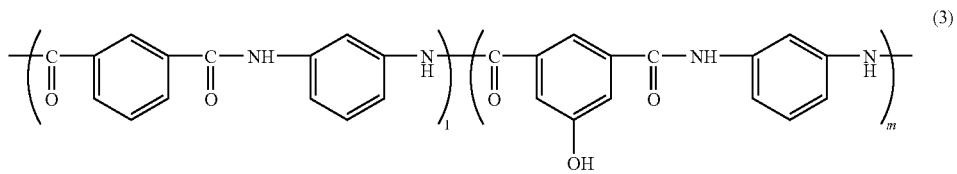

(wherein l and m are the same as those in Formula (1));

7. The epoxy resin composition according to any one of above mentioned 1 to 4, wherein the polyamide resin of component (b) is a compound having the structure represented by the following Formula (4):

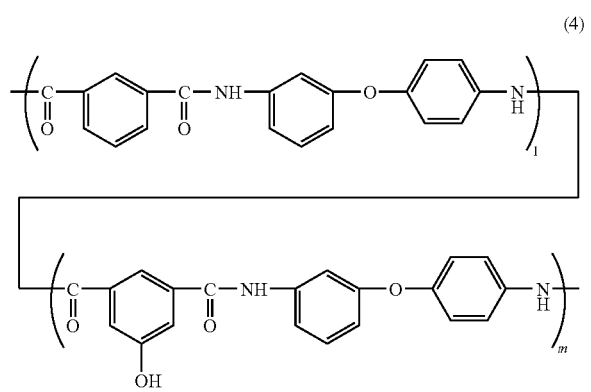

(wherein l and m are the same as those in Formula (1));

8. The epoxy resin composition according to any one of above mentioned 1 to 4, wherein l+m is a positive number of 2 to 20;

9. The epoxy resin composition according to any one of above mentioned 1 to 4, wherein the component (a) is one or more resins selected from the group consisting of novolak epoxy resins, xylylene skeleton-containing phenolic novolak epoxy resins, biphenyl skeleton-containing novolak epoxy resins, bisphenol A epoxy resins, bisphenol F epoxy resins, tetramethylbiphenol epoxy resins and triphenylmethane epoxy resins;

10. The epoxy resin composition according to above mentioned 8, wherein the component (a) is a biphenyl skeleton-containing novolak epoxy resin represented by the following Formula (2):

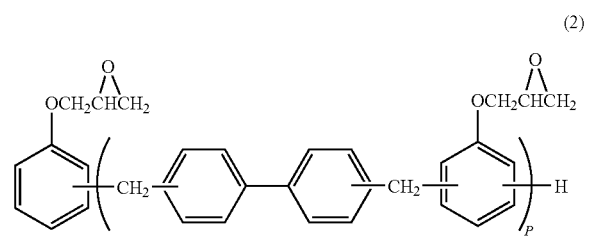

(wherein, p is an average having a positive number of 0.1 to 10);

11. The epoxy resin composition according to any one of above mentioned 1 to 4, further containing a curing accelerator;

12. A varnish, prepared by dissolving the epoxy resin composition according to any one of above mentioned 1 to 11 in a solvent;

13. A varnish, containing a solvent and the epoxy resin composition according to above mentioned 12 respectively in amounts of 10 to 70 wt % and the balance relative to all amount of the varnish;

14. The varnish according to above mentioned 13, wherein the solvent is a C4 to C6 aliphatic ketone solvent;

15. A sheet, having a planar backing and one or two layers of the epoxy resin composition according to any one of above mentioned 1 to 11 formed on one or two faces thereof;

16. A sheet, having a cured product layer prepared by curing the one or two layers of the epoxy resin composition according to any one of above mentioned 1 to 11 formed on one or two faces of a planar backing;

17. The sheet according to above mentioned 16 or 17, wherein the planar backing is a polyimide film, a metal foil, or a release film;

18. A prepreg, being prepared by impregnating a base material with the varnish according to above mentioned 12 and drying the resulting base material;

19. A method of curing an epoxy resin composition, heating the epoxy resin composition according to any one of above mentioned 1 to 11;

20. A curing agent for an epoxy resin, containing, as an active ingredient, a polyamide resin having the structure represented by the following Formula (1):

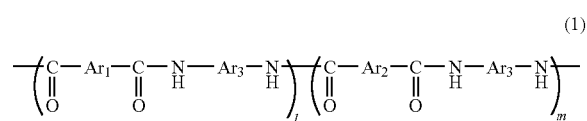

(wherein, l and m are averages, satisfying the formula: m/(l+m)=0.05; and l+m is a positive number of 2 to 200; $Ar_1$ represents a bivalent aromatic group; $Ar_2$ represents a phenolic hydroxyl group-containing bivalent aromatic group; $Ar_3$ represents:

-ph($R_1$)n- or

-ph($R_2$)n-X-ph($R_3$)n-;

-ph($R_1$)n-, -ph($R_2$)n- and -ph($R_3$)n- represent respectively, $R_1$-substituted, $R_2$-substituted and $R_3$-substituted phenylene groups, or an unsubstituted phenylene group; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond); and 21. The epoxy resin curing agent according to above 20, wherein $Ar_3$ is a group represented by:

-ph($R_1$)n- or

-ph($R_2$)n-O-ph($R_3$)n-.

22. A curing agent for epoxy resin according to claim 20, wherein m/(l+m)is 0.05 or more.

23. The epoxy resin composition according to claim 1, wherein m/(l+m)is 0.05 or more.

BEST MODE FOR CARRYING OUT THE INVENTION

The polyamide resin for use in the present invention is a phenolic hydroxyl group-containing aromatic polyamide resin having the structure represented by Formula (1) above in its polymer structure. The phenolic hydroxyl group-containing aromatic polyamide resin can be prepared, in a similar manner, for example, to the phenolic hydroxyl group-containing aromatic polyamide resins specifically described in JP-A No. 8-143661, by polycondensation of a phenolic hydroxyl group-containing aromatic dicarboxylic acid corresponding to Formula (1) above (hereinafter, also referred to as a phenolic hydroxyl group-containing aromatic dicarboxylic acid), an aromatic dicarboxylic acid having no phenolic hydroxyl group corresponding to Formula (1) above mentioned, and an aromatic diamine corresponding to Formula (1) above mentioned (diamine represented by Formula (i) or (ii) below).

If the polycondensation is carried out in the presence of a phosphorous ester and a pyridine derivative as the condensing agents, straight-chain aromatic polyamide resins can be easily produced without protection of the functional group, i.e., phenolic hydroxyl group, and without the reactions between the phenolic hydroxyl group and other reaction groups such as carboxyl and amino groups. In addition, the polycondensation does not demand high temperature, and can be carried out advantageously at around 150° C. or less.

Examples of the aromatic diamines corresponding to Formula (1) above include the aromatic diamines represented by the following Formula:

$H_2N\text{-ph}(R_1)n\text{-}NH_2$ or (i)

$H_2N\text{-ph}(R_2)n\text{-}X\text{-ph}(R_3)n\text{-}NH_2$ (ii)

(wherein, -ph($R_1$)n-, -ph($R_2$)n- and -ph($R_3$)n- respectively represent $R_1$ substituted, $R_2$ substituted and $R_3$ substituted phenylene groups, or an unsubstituted phenylene group; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond), and a phenylenediamine of Formula (i) or a diaminodiphenylether of Formula (ii) wherein X is O is preferable.

Examples of the aromatic diamines of the Formula (i) or (ii) include phenylenediamine derivatives such as m-phenylenediamine, p-phenylenediamine, and m-tolylenediamine; diaminodiphenylether derivatives such as 4,4'-diaminodiphenylether, 3,3'-dimethyl-4,4'-diaminodiphenylether, and 3,4'-diaminodiphenylether; diaminodiphenylthioether derivatives such as 4,4'-diaminodiphenylthioether, 3,3'-dimethyl-4,4'-diaminodiphenylthioether, 3,3'-diethoxy-4,4'-diaminodiphenylthioether, 3,3'-diaminodiphenylthioether, and 3,3'-dimethoxy-4,4'-diaminodiphenylthioether; diaminobenzophenone derivatives such as 4,4'-diaminobenzophenone, and 3,3'-dimethyl-4,4'-diaminobenzophenone; diaminodiphenylsulfone derivatives such as 4,4'-diaminodiphenylsulfoxide, and 4,4'-diaminodiphenylsulfone; benzidine derivatives such as benzidine, 3,3'-dimethylbenzidine and 3,3'-dimethoxybenzidine; 3,3'-diaminodiphenyl; xylylenediamine derivative such as p-xylylenediamine, m-xylylenediamine, and o-xylylenediamine; and the like, and the phenylenediamine or diaminodiphenylether derivatives are preferable, and further, 3,4'-diaminodiphenylether is particularly preferable from the points of solvent solubility and flame resistance. These diamines may be used alone or in combination of two or more.

The phenolic hydroxyl group-containing aromatic dicarboxylic acid for use in the present invention is not particularly limited if its aromatic ring has a structure containing one carboxyl group and one or more hydroxyl groups, and examples thereof include dicarboxylic acids having one hydroxy group and two carboxyl groups on the benzene ring such as 5-hydroxyisophthalic acid, 4-hydroxyisophthalic acid, 2-hydroxyisophthalic acid, 3-hydroxyisophthalic acid, and 2-hydroxyterephthalic acid.

In addition, examples of the aromatic dicarboxylic acids having no phenolic hydroxyl group for the polyamide resin for use in the present invention include, but are not limited to, phthalic acid, isophthalic acid, terephthalic acid, 4,4'-oxydibenzoic acid, 4,4'-biphenyldicarboxylic acid, 3,3'-methylenedibenzoic acid, 4,4'-methylenedibenzoic acid, 4,4'-thiodibenzoic acid, 3,3'-carbonyldibenzoic acid, 4,4'-carbonyldibenzoic acid, 4,4'-sulfonyldibenzoic acid, 1,5-naphthalenedicarboxylic acid, 1,4-naphthalenedicarboxylic acid, 2,6-naphthalenedicarboxylic acid, 1,2-naphthalenedicarboxylic acid, and the like. Dicarboxylic acids having two carboxyl groups on the benzene ring are usually preferable.

In regard to the ratio of the aromatic dicarboxylic acid having no phenolic hydroxyl group to the aromatic dicarboxylic acid having a phenolic hydroxyl group, the phenolic hydroxyl group-containing aromatic dicarboxylic acid is usually contained in an amount of 1 mole % or more, preferably 5 mole % or more, more preferably 10 mole % or more, relative to all dicarboxylic acids. When the dicarboxylic acids are used at the ratio above, the resulting polyamide resin satisfies the following condition in Formula (1): normally m/(l+m)≧0.01, in view of improvement of hardness of cured product, preferably m/(l+m)≧0.05, more preferably m/(l+m)≧0.1. The other hand, in view of flexibility of cured product, m/(l+m) is preferably less than 0.05. Furthermore, the resin of m/(l+m)<0.05 has advantage that it is easy to remove the solvent used in production process. The values of m and l can be determined, for example, by gel-permeation chromatography, NMR, or others.

Examples of the phosphorous esters for use as the condensing agent include, but are not limited to, triphenyl phosphite, diphenyl phosphate, tri-o-tolyl phosphate, di-o-tolyl phosphite, tri-m-tolyl phosphite, tri-p-tolyl phosphite, di-p-tolyl phosphite, di-p-chlorophenyl phosphate, tri-p-chlorophenyl phosphite, di-p-chlorophenyl phosphite, and the like.

In addition, examples of the pyridine derivatives for use together with the phosphorous ester include pyridine, 2-picoline, 3-picoline, 4-picoline, 2,4-lutidine, and the like. The pyridine derivative used as a condensing agent is usually used as it is added to an organic solvent.

Preferably, the organic solvent does not practically react with the phosphorous ester, dissolves the aromatic diamine and the aromatic dicarboxylic acid, and is a good solvent for the reaction product, i.e., the phenolic hydroxyl group-containing aromatic polyamide resin. Examples of such organic solvents include amide solvents such as N-methylpyrrolidone and dimethylacetamide, and N-methyl-2-pyrrolidone is preferable. Normally, a mixture of a pyridine derivative and a solvent containing the pyridine derivative in an amount of 5 to 30 wt % is used.

For production of a polyamide resin having a higher polymerization degree, it is preferable to add an inorganic salt such as lithium chloride, calcium chloride, or the like, in addition to the phosphorous ester and the pyridine derivative.

Hereinafter, the method of producing the polyamide resin of Formula (1) will be described in more detail.

A phosphorous ester is first added to a mixed solvent of an organic solvent containing a pyridine derivative; an aromatic dicarboxylic acid and an aromatic diamine in an amount of 0.5 to 2 moles relative to 1 mole of the dicarboxylic acid are added thereto; and the mixture is stirred under heat and a nitrogen or other inactive atmosphere. After the reaction, the reaction mixture is poured into a poor solvent such as methanol or hexane, separating purified polymer; and further purification by reprecipitation method for removal of byproducts, inorganic salts, and the like gives a desirable polyamide resin.

In the production method above mentioned, the amount of the condensing agent, phosphorous ester, added is normally one mole or more relative to one mole of the carboxyl group, but an amount of 30 moles or more is not efficient. The amount of the pyridine derivative should be equal amounts of mole or more relative to that of the carboxyl group, but the pyridine derivative, which also plays a role as a reaction solvent, is often used in an excessive amount in practice. Theoretically, the use amount of the mixture of the pyridine derivative and the organic solvent is preferably in the range of 5 to 30 wt parts relative to 100 wt parts of the resulting polyamide resin. The reaction temperature is normally 60 to 180° C. The reaction time is greatly dependent on the reaction temperature. The reaction system is preferably stirred until the reaction solution reaches the highest-viscosity (highest polymerization degree) in any case, and the reaction times is normally several minutes to 20 hours.

The intrinsic viscosity of the phenolic hydroxyl group-containing aromatic polyamide resin having a favorable average polymerization degree (as determined by using a 0.5 g/dl N,N-dimethylacetamide solution at 30° C.) is in the range of 0.1 to 4.0 dl/g, normally 0.2 to 2.0 dl/g, preferably 0.35 to 0.70 dl/g, and particularly preferably 0.40 to 0.60 dl/g. Generally, the intrinsic viscosity is used for judging whether a resin has a favorable average polymerization degree. An aromatic polyamide resin having an intrinsic viscosity of less than 0.1 dl/g is unfavorable, as it has a poor film-forming capability and exhibits insufficient properties as the aromatic polyamide resin. On the contrary, the resin having an intrinsic viscosity of greater than 4.0 dl/g, i.e., an excessively high polymerization degree, causes problems such as low solvent solubility and deterioration in processability.

A simple method of adjusting the polymerization degree of polyamide resin is, for example, to use one of the aromatic diamine and the aromatic dicarboxylic acid in an excessive amount. Generally, use of one component in an excessive amount results in decrease in the molecular weight of the resulting polymer and gives a polyamide resin having the terminal groups corresponding to the material excessively used. Although use of equal amounts of these components is preferable for production of a high-molecular weight polyamide resin, polyamide resins having amino groups at both ends (compound represented by Formula (1) having a hydrogen atom at the right end and $H_2N$—$Ar_3$—NH— at the left end) are preferable from the viewpoint of adhesiveness. Such a polyamide resin is obtained when an aromatic diamine is used in excess relative to the aromatic dicarboxylic acid by about 0.1 to 20 mole %, preferably 0.2 to 15 mole %, and more preferably 0.5% to 15 mole %. In some cases, an excess of 1 to 5 mole % is most preferable.

The total (average polymerization degree) of l and m of the polyamide resin of Formula (1) obtained above depends on the polymerization condition, the starting compound used, and the like, but is normally in the range of 2 to 200. Polyamide resins having a total l+m of approximately 2 to 40 are favorable from the viewpoints of low viscosity and processability. Further, a resin having a total of 10 or more gives a cured product which can be processed into a film; that of 20 or more, a cured product suitable for the film; that of 30 or more, a cured product suitable for the film; and that of about 50 to 200, a cured product higher in flexibility. A flexible cured product is preferable when the epoxy resin composition according to the present invention is used to be processed into a film. Thus preferably, the average polymerization degree of the polyamide resin according to the present invention is suitable selected according to the application of the cured composition containing the same. Considering the application as a film or the like, the cured product is preferably both flexible and easily processable (less viscous), and thus, the average polymerization degree is approximately 10 to 60, preferably approximately 20 to 55, and particularly preferably about 40, or 35 to 45. A preferable viscosity is favorably determined by using the intrinsic viscosity above as an indicator.

The polyamide resin of Formula (1) prepared in the manner described above is suitable as an epoxy resin curing agent and used as the epoxy resin curing agent containing the resin as an active ingredient.

The content of the polyamide resin in the epoxy resin composition according to the present invention is normally 30% or more (by weight, the same shall apply unless specified otherwise), preferably 40% or more, and more preferably 50% or more relative to the total composition, and the upper limit is normally approximately 98% or less and preferably 95% or less.

Various epoxy resins may be used as the epoxy resin composition according to the present invention. The epoxy resin is not particularly limited, if it is used for electric and electronic parts. Examples thereof include alicyclic epoxy resins; aromatic epoxy resin; reaction products from a polyvalent alcohol such as sorbitol polyglycidylether, polyglycerol polyglycidylether, diglycerol polyglycidylether, pentaerythritol polyglycidylether, glycerol polyglycidylether, trimethylolpropane polyglycidylether, neopentylglycol diglycidylether, or 1,6-hexanediol diglycidylether and an epichlorohydrin; alicyclic or straight-chain epoxy resins prepared by oxidation of the double bonds with a peroxide or the like; and the like. The epoxy resin for use in the present invention has an epoxy equivalence (as determined according to JIS-K-7236) normally of approximately 50 to 600 g/eq, preferably approximately 100 to 450 g/eq, and more preferably approximately 120 to 350 g/eq.

Among the epoxy resins above mentioned, aromatic epoxy resins are preferable, from the viewpoint of the flame resistance of cured product. The preferable aromatic epoxy resin is not particularly limited, if it has aromatic rings such as benzene, biphenyl, or naphthalene and epoxy groups in the molecule. Specific examples thereof include novolak epoxy resins, xylylene skeleton-containing phenolic novolak epoxy resins, biphenyl skeleton-containing novolak epoxy resins, bisphenol A epoxy resins, bisphenol F epoxy resins, tetramethylbiphenol epoxy resins, and the like.

Among the epoxy resins above, biphenyl skeleton-containing novolak epoxy resins are preferably, and the epoxy resins represented by Formula (2) above are particularly preferable for ensuring a sufficient flame resistance and a flexibility of cured product. The epoxy resins of Formula (2) are easily available as commercial products, for example, NC-3000 and NC-3000-H (both of manufactured by Nippon Kayaku Co., Ltd).

According to the present invention, as curing agents, the polyamide resins having the structure represented by Formula (1), and other curing agents may be used in combination in the epoxy resin composition. Typical examples of the curing agents used in combination include, but are not limited to, diaminodiphenylmethane, diethylenetriamine, triethylenetetramine, diaminodiphenylsulfone, isophoronediamine, dicyandiamide, polyamide resins prepared from linoleic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, phenolic novolak, triphenylmethane and the modified derivatives thereof, imidazole, $BF_3$-amine complex, guanidine derivatives, and the like. The content of the polyamide resin represented by Formula (1) in the entire curing agent is normally 20% or more, preferably 30% or more, and still more preferably 40% to 100%.

In regard to the content of the curing agent in the epoxy resin composition according to the present invention, the equivalence of the active group of curing agent reactive with the epoxy group is normally 0.4 to 1.5, preferably 0.6 to 1.3, and still more preferably 0.7 to 1.2 relative to 1 equivalence of the epoxy group of epoxy resin. In the case of the polyamide of Formula (1) of the present invention, it is the equivalence of the phenolic hydroxyl group that is reactive with epoxy group (active hydrogen equivalence). The active hydrogen equivalence can be determined, for example, by NMR, but values calculated from the amount of phenolic hydroxyl group-containing diamine supplied were used for convenience in the Examples below.

In addition, a curing accelerator may be used together when the curing agent is used. Typical examples of the curing accelerators include imidazoles such as 2-methylimidazole, 2-ethylimidazole, and 2-ethyl-4-methylimidazole; tertiary amines such as 2-(dimethylaminomethyl)phenol and 1,8-diaza-bicyclo(5,4,0)undecene-7; phosphines such as triphenylphosphine; metal compounds such as tin octoate; and the like. The curing accelerator is used as needed in an amount of 0.1 to 5.0 wt parts relative to 100 wt parts of epoxy resin.

The epoxy resin composition according to the present invention may contain an inorganic filler as needed. Typical examples of the inorganic fillers include silica, alumina, talc, and the like. The inorganic filler is used in the epoxy resin composition according to the present invention in an amount of 0 to 90 wt %. The epoxy resin composition according to the present invention may further contain various compounding agents including silane-coupling agent, mold release agent such as stearic acid, palmitic acid, zinc stearate, or calcium stearate, pigment, and the like.

A preferable epoxy resin composition according to the present invention contains a polyamide resin of Formula (1) having a phenylene group as $Ar_1$, a hydroxy-substituted phenylene group as $Ar_2$, and a group represented by —NH-ph($R_1$)n-NH— or —NH-ph($R_2$)n-O-ph($R_3$)n-NH— as $Ar_3$; an epoxy resin represented by Formula (2); and an curing accelerator as needed.

The epoxy resin composition according to the present invention is obtained by blending the respective components uniformly. The epoxy resin composition according to the present invention can be produced, for example, by blending an epoxy resin, an curing agent containing the polyamide resin of Formula (1), and as needed, a curing accelerator, an inorganic filler, and another compounding agent in an extruder or an kneader roll sufficiently until the mixture becomes uniform. The resin composition can be easily converted to a cured product thereof, by forming the composition into a suitable shape as needed and curing the composition by a method similar to known methods, for example, by heating. Specifically, the cured product can be produced by molding a resin composition as needed, for example, by melt casting, transfer molding, injection molding, compression molding, or the like and additionally heating the composition at 80 to 200° C. for 2 to 10 hours. The cured product preferably has a higher glass transition temperature, for example, a glass transition temperature as determined by DMA method of 200° C. or more and more preferably 220° C. or more, from the view point of heat resistance. Although there is no particular upper limit, the glass transition temperature is usually about 300° C. or less, for providing the cured product with flexibility.

The varnish according to the present invention is prepared by dissolving the epoxy resin composition according to the present invention in a solvent. Examples of the solvents include γ-butylolactones; amide solvents such as N-methylpyrrolidone (NMP), N,N-dimethyl formamide (DMF), N,N-dimethylacetamide, and N,N-dimethylimidazolidinone; sulfones such as tetramethylenesulfone; ether solvents such as diethyleneglycol dimethylether, diethyleneglycol diethylether, propylene glycol, propylene glycol monomethylether, propylene glycol monomethylether monoacetate, and propylene glycol monobutylether; ketone solvents such as acetone, methylethylketone, methylisobutylketone, cyclopentanone, and cyclohaxanone; aromatic solvents such as toluene and xylene; and the like. Among them, ketone solvents, in particular C4 to C6 aliphatic ketone solvents, are suitable for mixing the resin composition according to the present invention uniformly. The solid matter concentration of the varnish obtained is usually 10 to 80 wt % and preferably 10 to 70 wt %.

Sheets having a layer of the epoxy resin composition according to the present invention are prepared by coating and drying the varnish above on a base material, usually a planar substrate. In such a case, a release sheet is usually used as the base material.

The sheets having a cured product layer obtained by curing a layer of the epoxy resin composition according to the present invention are prepared by curing under heat the layer obtained by coating and drying the varnish above on a backing (base material), usually a planar backing. Namely, the resin composition layer is obtained by coating and drying the varnish above on a planar substrate by any one of various known coating methods such as gravure coating, screen printing, metal mask method, spin coating, and the like to a desirable dry thickness, for example, of 5 to 100 μm. The coating method is selected suitably according to the kind and the size of base material and the desirable thickness of the coated film. Examples of the base materials include films of various polymers such as polyamide, polyimide, polyamide-imide, polyarylate, polyethylene terephthalate, polybutylene terephthalate, polyether ether ketone, polyether imide, polyether ketone, polyketone, polyethylene, and polypropylene and/or the copolymers thereof; and metal foils such as copper foil, and a polyimide film or a metal foil is preferable. The sheet having the resin composition layer thus obtained may be used as it is for the next curing; or alternatively depending on the application, may be subjected to the next curing treatment after the sheet is prepared by using a release film as the base material and covering the surface of the layer with a protective sheet as needed, adhering the resin composition layer on another substrate after removal of the protective sheet during use, and processing as needed after removal of the release film.

A sheet having a cured product layer is prepared then by heating the resin composition layer obtained. Favorable examples of the applications of the sheet according to the present invention include flexible printed wiring board materials such as substrates for flexible printing wiring, cover lay materials, bonding sheet, and the like, and the epoxy resin composition according to the present invention functions as an adhesive for these materials.

Prepregs using the epoxy resin composition according to the present invention can be prepared by impregnating the base material, for example, of glass fiber, carbon fiber, polyester fiber, polyamide fiber, alumina fiber, paper, or the like with a varnish obtained by dissolving the resin composition in the solvent above and heating and drying the base material. Cured products of the prepregs can be obtained by forming and curing the prepregs obtained, for example, by heat press molding. The content of the solvent at that time is usually approximately 10 to 70%, preferably 15 to 70%, relative to the total of the resin composition and the solvent.

EXAMPLES

Hereinafter, the present invention will be described more specifically with reference to Examples and Comparative Examples. In the following Examples, parts are weight parts unless specified otherwise.

Example 1

In a flask equipped with a thermometer, a condenser, and a stirrer were added 45.5 parts of 5-hydroxyisophthalic acid, 41.5 parts of isophthalic acid, 55.1 parts of m-phenylenediamine, 3.4 parts of lithium chloride, 344 parts of N-methyl-2-pyrrolidone, and 115.7 parts of pyridine under nitrogen gas flow, and the mixture was stirred and dissolved. 251 parts of triphenyl phosphate was added thereto, and the mixture was allowed to react at 90° C. for 4 hours reaction, to give a solution of a phenolic hydroxyl group-containing polyamide resin. After cooling the reaction solution to room temperature, the reaction solution was added into 500 parts of methanol, to precipitate a resin represented by the following Formula (3):

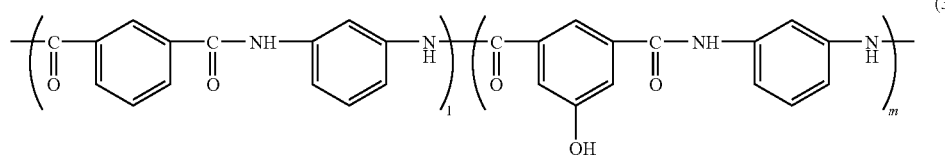
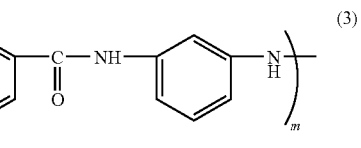

The resin precipitate was washed additionally with 500 parts of methanol and further purified under reflux of methanol, to give 120 parts of polyamide resin (A). The intrinsic viscosity of the polyamide resin (A) was 0.49 dl/g (dimethylacetamide solution, 30° C.); l and m in Formula (3) were respectively approximately 6 and approximately 6; and the equivalence of the active hydrogen reactive with epoxy group was 417 g/eq.

Example 2

166 parts of a polyamide resin (B) represented by the following Formula (4) was obtained in a similar manner to Example 1, except that 55.1 parts of m-phenylenediamine was replaced with 102 parts of 3,4'-diaminodiphenylether.

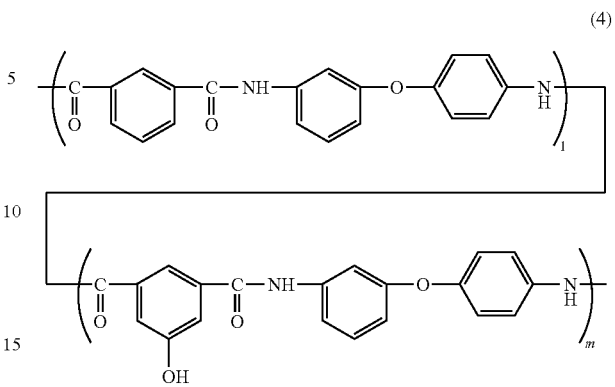

The intrinsic viscosity of the polyamide resin (B) obtained was 0.56 dl/g (dimethylacetamide solution, 30° C.); l and m in Formula (4) were respectively approximately 20 and approximately 20; and the equivalence of the active hydrogen reactive with epoxy group was 633 g/eq.

Example 3

A resin represented by the Formula (4) was precipitated in a similar manner to Example 2, except the amounts of 5-hydroxyisophthalic acid and isophthalic acid in Example 2 were changed respectively to 13.0 and 71.1 parts. The precipitated resin was washed with 500 parts of methanol and further purified under reflux of methanol, to give 163 parts of polyamide resin (C). The intrinsic viscosity of the polyamide resin (C) obtained was 0.54 dl/g (dimethylacetamide solution, 30° C.); l and m in Formula(4) were respectively approximately 34 and approximately 6; and the equivalence of the active hydrogen reactive with epoxy group was 1,868 g/eq.

Example 4

In a flask equipped with a thermometer, a condenser, and a stirrer were added 2.7 parts of 5-hydroxyisophthalic acid, 119.6 parts of isophthalic acid, 150 parts of 3,4'-diaminodiphenylerther, 7.8 parts of lithium chloride, 811.5 parts of N-methyl-2-pyrrolidone, and 173.6 parts of pyridine under nitrogen gas flow, and the mixture was stirred and dissolved. 376.2 parts of triphenyl phosphite was added thereto, and the mixture was allowed to react at 90° C. for 4 hours, to give a solution of a phenolic hydroxyl group-containing polyamide resin. After cooling the reaction solution to room temperature, the reaction solution was added into 1000 parts of methanol to precipitate a resin represented by the Formula (4)

mentioned above: The resin precipitate was washed additionally with 1000 parts of methanol and further purified under reflux of methanol, to give 270 parts of polyamide resin (D). The intrinsic viscosity of the polyamide resin (D) was 0.54 dl/g (dimethylacetamide solution, 30° C.); in Formula (4), 1 was approximately 39.2 and m was approximately 0.8; and the equivalence of the active hydrogen reactive with epoxy group was 5000 g/eq.

Application Examples 1 to 4

A varnish according to the present invention was obtained by mixing an epoxy resin NC-3000 represented by Formula (2) (manufactured by Nippon Kayaku Co., Ltd., epoxy equivalence: 275 g/eq, softening point: 58° C., p: 2.5) (NC-3000 in the Table) and a liquid bisphenol A epoxy resin RE-310S (manufactured by Nippon Kayaku Co., Ltd., epoxy equivalence: 184 g/eq) (RE-310 in the Table) as epoxy resins; triphenylphosphine (TPP) as a curing accelerator; and cyclopentanone as a solvent at the weight ratio shown in Table 1, to the polyamide resin (A) or (B) obtained in Example 1 or 2

TABLE 1

| | Application Example | | | |
|---|---|---|---|---|
| | 1 | 2 | 3 | 4 |
| NC-3000 | 100 | 100 | | 100 |
| RE-310 | | | 100 | |
| Polyamide resin (A) | 136 | | 203 | |
| Polyamide resin (B) | | 188 | | 281 |
| TPP | 2 | 2 | 2 | 2 |
| Cyclopentanone | 238 | 290 | 305 | 383 |

Each of the four varnishes according to the present invention above was applied on a PET film to a dry thickness of 50 μm and cured by heating at 180° C. for 1 hour, and after removal of the PET film, a sheet sample (thickness: 12.5 μm) was obtained. The sample obtained was no cracking by bending and had a sufficiently high film-forming capability. A flame resistance test of the cured product was performed according to UL 94-VTM. Separately, the glass transition temperatures of these samples were determined by DMA (Dynamic Mechanical Analysis). In addition, each varnish obtained was coated on a polyimide film having a thickness of 25 μm (Upilex 25SGA, manufactured by Ube Industries, Ltd) to a dry thickness of 10 μm by using an applicator. After removal of solvent by drying at 100° C. for 10 minutes, a same polyimide film was overlaid on the resultant resin layer and the resin layer was cured at 180° C. for 1 hour. The degrees of exfoliation (orthogonal exfoliation) of respective samples were evaluated. Results are summarized in Table 2.

TABLE 2

| | Application Example | | | |
|---|---|---|---|---|
| | 1 | 2 | 3 | 4 |
| Flame resistance test | V-0 | V-0 | V-0 | V-0 |
| Glass transition temperature (° C.) | 245 | 234 | 232 | 228 |
| Exfoliation test | Cohesive failure | Cohesive failure | Cohesive failure | Cohesive failure |

In the Table, V-0 in the line of the flame resistance test indicates the highest mark in the flame resistance of plastics.

In the exfoliation test, the degree of exfoliation was examined by pulling one of the two adhered films gradually in the orthogonal angle (90°) after the adhered film is fixed. The cohesive failure in the Table means that the film is damaged without exfoliation of two films.

Application Examples 5 to 8

A varnish according to the present invention was obtained by mixing a triphenylmethane epoxy resin EPPN-502H (manufactured by Nippon Kayaku Co., Ltd., epoxy equivalence 170 g/eq, softening point 65° C.) (EPPN-502H in the Table) or a liquid bisphenol F epoxy resin RE-304S (manufactured by Nippon Kayaku Co., Ltd., epoxy equivalence 170 g/eq) (RE-304S in the Table) as an epoxy resin; 2-phenyl-4,5-dihydroxymethylimidazole (2PHZ) as a curing accelerator; and cyclopentanone as a solvent at a weight ratio shown in Table 3 to the polyamide resin (B) or (C) obtained in Example 2 or 3.

TABLE 3

| | Application Example | | | |
|---|---|---|---|---|
| | 5 | 6 | 7 | 8 |
| RE-304S | 100 | 100 | | |
| EPPN-502H | | | 100 | 100 |
| Polyamide resin (B) | 372 | | 372 | |
| Polyamide resin (C) | | 1098 | | 1098 |
| 2PHZ | 2 | 2 | 2 | 2 |
| Cyclopentanone | 474 | 1200 | 474 | 1200 |

Each of the four varnishes according to the present invention above was applied on a PET film to a dry thickness of 50 μm and cured by heating at 180° C. for 1 hour, and after removal of the PET film, a sheet sample was obtained. The sample obtained was resistant to the cracking by bending and had a sufficiently high film-forming capability. A flame resistance test of the cured product was performed according to UL 94-VTM. Separately, the glass transition temperatures of these samples were determined by DMA. In addition, each varnish obtained was coated on a polyimide film having a thickness of 25 μm (Upilex 25SGA, manufactured by Ube Industries, Ltd) to a dry thickness of 18 μm by using an applicator. After drying and solvent removal at 100° C. for 10 minutes, the same polyimide film or the roughened surface of a surface-modified copper foil was overlaid on the resin film, and the laminate was cured at 180° C. for 1 hour in a hot plate pressing machine. The degrees of exfoliation (orthogonal exfoliation) of respective samples were evaluated. Results are summarized in Table 4.

TABLE 4

| | Application Example | | | |
|---|---|---|---|---|
| | 5 | 6 | 7 | 8 |
| Flame resistance test | V-0 | V-0 | V-0 | V-0 |
| Glass transition temperature (° C.) | 235 | 242 | 260 | 272 |
| Exfoliation test (polyimide) | Cohesive failure | Cohesive failure | Cohesive failure | Cohesive failure |
| Exfoliation test (copper foil) | Cohesive failure | Cohesive failure | Cohesive failure | Cohesive failure |

INDUSTRIAL APPLICABILITY

Cured products of the epoxy resin composition according to the present invention have a sufficient high flexibility when formed into a thin film, have a flame resistance even though the cured products do not contain a halogen flame retardant, an antimony compound, or the like and are superior in heat resistance and adhesiveness, and thus are extremely useful in a wide range of applications, for example, as molded materials, cast materials, laminate materials, paints, adhesives, resists, and the like.

The invention claimed is:

1. An epoxy resin composition, comprising an epoxy resin (a) and, as a curing agent, a polyamide resin (b) having the structure represented by the following Formula (1):

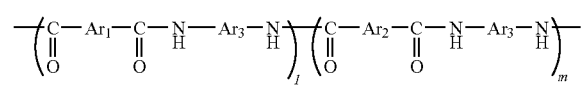

wherein, l and m are averages, satisfying the following formula: $m/(l+m) \geq 0.01$; and l+m is a positive number of 2 to 200;

$Ar_1$ represents a bivalent aromatic group; $Ar_2$ represents a phenolic hydroxyl group-containing bivalent aromatic group;

$Ar_3$ represents:

-ph($R_1$)n- or

-ph($R_2$)n-X-ph($R_3$)n-, wherein, -ph($R_1$)n-, -ph($R_2$)n- and -ph($R_3$)n- represent respectively $R_1$-substituted, $R_2$-substituted and $R_3$-substituted phenylene groups; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond, and being prepared by polycondensation of a phenolic hydroxy group containing aromatic dicarboxylic acid corresponding to Formula (1), an aromatic dicarboxylic acid having no phenolic hydroxy group corresponding to Formula (1) and an aromatic diamine corresponding to Formula (1), wherein the equivalence of the active hydrogen in the polyamide resin (b) is 0.7 to 1.2 equivalence relative to 1 equivalence of the epoxy group in the epoxy resin (a).

2. The epoxy resin composition according to claim 1, wherein as said curing agent, the polyamide resin (b) and other curing agents are optionally used in combination in the epoxy resin composition and the content of the polyamide resin of component (b) is 30 wt % or more relative to all curing agents contained in the composition.

3. The epoxy resin composition according to claim 1, comprising the epoxy resin of component (a) in an amount of 2 to 50 wt % and the polyamide resin of component (b) in an amount of 50 to 98 wt % based on the entire composition.

4. The epoxy resin composition according to any one of claims 1 to 3, wherein $Ar_3$ is a group represented by:

-ph($R_1$)n- or

-ph($R_2$)n-O-ph($R_3$)n-.

5. The epoxy resin composition according to any one of claims 1 to 3, wherein the polyamide resin of component (b) is a compound having the structure represented by the following Formula (3):

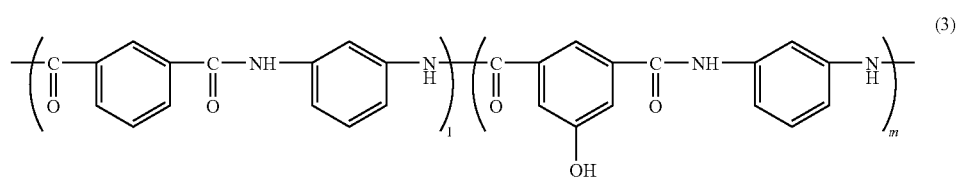

wherein l and m are the same as those in Formula (1).

6. The epoxy resin composition according to any one of claims 1 to 3, wherein the polyamide resin of component (b) is a compound having the structure represented by the following Formula (4):

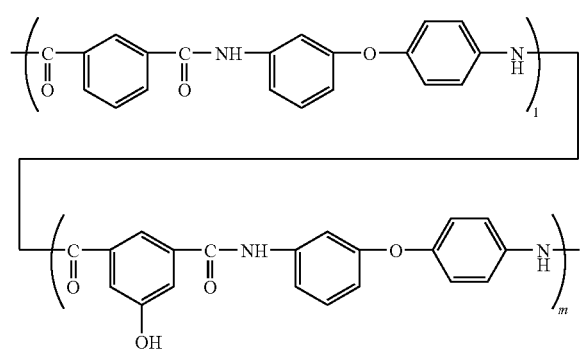

wherein l and m are the same as those in Formula (1).

7. The epoxy resin composition according to any one of claims 1 to 3, wherein l+m is a positive number of 2 to 20.

8. The epoxy resin composition according to claim 7, wherein the component (a) is a biphenyl skeleton-containing novolak epoxy resin represented by the following Formula (2):

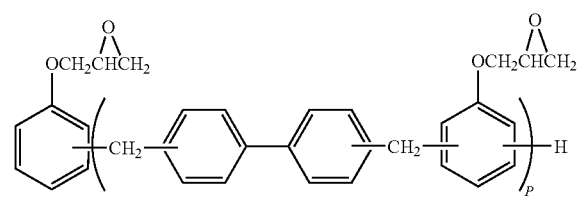

(wherein, p is an average having a positive number of 0.1 to 10).

9. The epoxy resin composition according to any one of claims 1 to 3, wherein the component (a) is one or more resins selected from the group consisting of novolak epoxy resins, xylylene skeleton-containing phenolic novolak epoxy resins, biphenyl skeleton-containing novolak epoxy resins, bisphenol A epoxy resins, bisphenol F epoxy resins, tetramethylbiphenol epoxy resins and triphenylmethane epoxy resins.

10. The epoxy resin composition according to any one of claims 1 to 3, further comprising a curing accelerator.

11. A varnish prepared by dissolving the epoxy resin composition according to claim 1 in a solvent.

12. A prepreg, characterized by being prepared by impregnating a base material with the varnish according to claim 11 and drying the resulting base material.

13. A varnish comprising a solvent and the epoxy resin composition according to claim 1, wherein the amount of said solvent is 10 to 70% relative to the total amount of solvent and epoxy resin in said varnish, with the balance being said epoxy resin composition.

14. The varnish according to claim 13, wherein the solvent is a C4 to C6 aliphatic ketone solvent.

15. A sheet, characterized by having a planar backing and one or two layers of the epoxy resin composition according to claim 1 formed on one or two faces thereof.

16. A sheet, characterized by having a cured layer prepared by curing the one or two layers of the epoxy resin composition according to claim 1 formed on one or two faces of a planar backing.

17. The sheet according to claim 15 or 16, wherein the planar backing is a polyimide film, a metal foil, or a release film.

18. A method of curing an epoxy resin composition, characterized by heating the epoxy resin composition according to claim 1.

19. The epoxy resin composition according to claim 1, wherein m/(l+m) is 0.05 or more.

20. A curing agent for epoxy resin, containing, as an active ingredient, a polyamide resin having the structure represented by the following Formula (1):

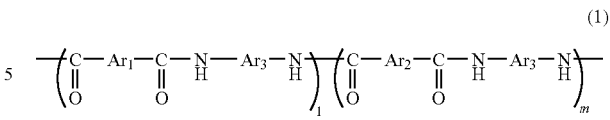
(1)

(wherein, l and m are averages, satisfying the following formula: $m/(l+m) \geqq 0.01$; and l+m is a positive number of 2 to 200;

$Ar_1$ represents a bivalent aromatic group; $Ar_2$ represents a phenolic hydroxyl group-containing bivalent aromatic group;

$Ar_3$ represents:

-ph($R_1$)n- or

-ph($R_2$)n-X-ph($R_3$)n-, wherein ph($R_1$)n-, -ph($R_2$)n- and ph($R_3$)n- represent respectively, $R_1$-substituted, $R_2$-substituted and $R_3$-substituted phenylene groups; n is an integer of 0 to 3; $R_1$, $R_2$ and $R_3$ each independently represent a C1 to C3 alkyl group or a C1 to C3 alkoxy group; and X represents O, S, CO, $SO_2$ or a single bond), and being prepared by polycondensation of a phenolic hydroxy group containing aromatic dicarboxylic acid corresponding to Formula (1), an aromatic dicarboxylic acid having no phenolic hydroxy group corresponding to Formula (1) and an aromatic diamine corresponding to Formula (1).

21. The epoxy resin curing agent according to claim 20, wherein $Ar_3$ is a group represented by:

-ph($R_1$)n- or

-ph($R_2$)n-O-ph($R_3$)n-.

22. A curing agent for epoxy resin according to claim 20, wherein m/(l+m) is 0.05 or more.

* * * * *